United States Patent
Uryu et al.

(10) Patent No.: US 9,932,067 B2
(45) Date of Patent: Apr. 3, 2018

(54) ELECTRIC POWER STEERING APPARATUS

(71) Applicant: NSK LTD., Tokyo (JP)

(72) Inventors: Kyosho Uryu, Tokyo (JP); Shin Kumagai, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/504,723

(22) PCT Filed: Sep. 17, 2014

(86) PCT No.: PCT/JP2014/074482
§ 371 (c)(1),
(2) Date: Feb. 17, 2017

(87) PCT Pub. No.: WO2016/042607
PCT Pub. Date: Mar. 24, 2016

(65) Prior Publication Data
US 2017/0267278 A1   Sep. 21, 2017

(51) Int. Cl.
*H02P 1/04* (2006.01)
*B62D 5/04* (2006.01)
(Continued)

(52) U.S. Cl.
CPC .......... *B62D 5/0484* (2013.01); *B62D 5/049* (2013.01); *B62D 5/0463* (2013.01);
(Continued)

(58) Field of Classification Search
CPC ... H02P 6/12; H02P 6/16; H02P 6/085; B62D 5/046; B62D 5/049
(Continued)

(56) References Cited

U.S. PATENT DOCUMENTS 8,810,167 B2 * 8/2014 Suzuki .................. H02P 21/50
    318/400.01
8,981,690 B2 * 3/2015 Itamoto ................ B62D 5/0487
    180/446
(Continued)

FOREIGN PATENT DOCUMENTS

JP          10-258757 A      9/1998
JP      2002-081961 A      3/2002
(Continued)

OTHER PUBLICATIONS

International Search Report for application No. PCT/JP2014/074482 dated Dec. 16, 2014.

*Primary Examiner* — Bentsu Ro
*Assistant Examiner* — Thai Dinh
(74) *Attorney, Agent, or Firm* — Sughrue Mion, PLLC

(57) ABSTRACT

An electric power steering apparatus that calculates a current command value based on at least a steering torque, performs a PWM-control of a brushless motor by an inverter based on the current command value, performs a current control by detecting a rotational angle of the brushless motor, and performs an assist-control of a steering system. The apparatus includes three rotational angle detecting systems to detect three rotational angles of the brushless motor; and an angle diagnosing section that compares absolute values of differences on respective angles outputted from the three rotational angle detecting systems with a threshold, and performs a process by diagnosing whether the rotational angle detecting systems are normal or abnormal; wherein the assist control is continuously performed by using output angles outputted from systems diagnosed as being normal.

4 Claims, 5 Drawing Sheets

(51) Int. Cl.
*H02P 6/16* (2016.01)
*H02P 6/08* (2016.01)
*H02P 6/12* (2006.01)

(52) U.S. Cl.
CPC ............ *B62D 5/0487* (2013.01); *H02P 6/085* (2013.01); *H02P 6/12* (2013.01); *H02P 6/16* (2013.01)

(58) Field of Classification Search
USPC ............... 318/400.09, 400.03, 722, 599, 437
See application file for complete search history.

(56) References Cited

U.S. PATENT DOCUMENTS

| | | | |
|---|---|---|---|
| 2004/0188172 A1 | 9/2004 | Asada | |
| 2008/0028870 A1 | 2/2008 | Tokumoto et al. | |
| 2008/0035411 A1* | 2/2008 | Yamashita | B62D 5/046 180/443 |
| 2011/0025244 A1* | 2/2011 | Ura | B62D 5/0403 318/400.21 |
| 2012/0049781 A1* | 3/2012 | Suzuki | H02P 6/10 318/722 |

FOREIGN PATENT DOCUMENTS

| | | |
|---|---|---|
| JP | 2004-194490 A | 7/2004 |
| JP | 2004-291923 A | 10/2004 |
| JP | 2005-274484 A | 10/2005 |
| JP | 2005-345284 A | 12/2005 |
| JP | 2010-149678 A | 7/2010 |
| JP | 2010-155501 A | 7/2010 |
| JP | 2011-025872 A | 2/2011 |
| JP | 2011-157004 A | 8/2011 |
| JP | 2011-244678 A | 12/2011 |
| JP | 2014-054871 A | 3/2014 |

* cited by examiner

PRIOR ART

ELECTRIC POWER STEERING APPARATUS

CROSS REFERENCE TO RELATED APPLICATIONS

This application is a National Stage of International Application No. PCT/JP2014/074482, filed on Sep. 17, 2014, the contents of all of which are incorporated herein by reference in their entirety.

TECHNICAL FIELD

The present invention relates to an electric power steering apparatus that performs a PWM-control of a brushless motor by an inverter based on a current command value, performs a current control by detecting rotational angles of the brushless motor, and performs an assist-control of a steering system, in particular to a high reliable electric power steering apparatus that detects the rotational angles of the brushless motor by a rotational angle detecting systems of 3-systems and diagnoses normality/abnormality (including a failure) of each system, and continues the assist-control by using detected angles of the rotational angles of the detecting systems of other normal 2-systems in a case only one system is diagnosed as being abnormal.

BACKGROUND ART

An electric power steering apparatus (EPS) that applies an assist torque (an assist force) with a rotatory power force of a motor to a steering system of a vehicle, gives a driving force of the motor as an assist to a steering shaft or a rack shaft by means of a transmission mechanism such as gears or a belt through a reduction mechanism. In order to accurately generate a torque of a steering assist force, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of a PWM (Pulse Width Modulation) control.

A general configuration of the conventional electric power steering apparatus will be described with reference to FIG. 1. A column shaft (a steering shaft or a steering wheel shaft) 2 connected to a steering wheel 1 is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting the steering torque Th of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command based on the steering torque Th detected by the torque sensor 10 and a vehicle speed Vel detected by a vehicle speed sensor 12, and controls a current supplied to the motor 20 based on a voltage control command value Vref obtained by performing compensation and so on with respect to the calculated current command value. A steering angle sensor 14 is not absolutely necessary, does not need to be disposed, and further a steering angle can be obtained through a rotational angle sensor such as a resolver or the like connected to the motor 20.

A controller area network (CAN) 50 to send/receive various information and signals on the vehicle is connected to the control unit 30, and it is also possible to receive the vehicle speed Vel from the CAN 50. Further, a Non-CAN 51 is also possible to connect to the control unit 30, and the Non-CAN 51 sends and receives a communication, analogue/digital signals, electric wave or the like except for the CAN 50.

The control unit 30 mainly comprises a CPU (including an MPU and an MCU), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 (or from CAN 50) are inputted into a current command value calculating section 31. The current command value calculating section 31 calculates a current command value Iref1 that is a control target value that is supplied to the motor 20 by using an assist map and so on based on the inputted steering torque Th and the vehicle speed Vel.

The current command value Iref1 is inputted into a current limiting section 33 through an adding section 32A, a current command value Irefm of which a maximum current is limited is inputted into a subtracting section 32B, a deviation I (=Irefm−Im) between the current command value Iref3 and a motor current value Im that is fed back is calculated, and the deviation I is inputted into a PI (proportional and integral)-control section 35 that is a current control section for improving an characteristic of a steering action. The voltage control command value Vref of which a characteristic is improved by the PI-control section 35 is inputted into a PWM-control section 36, and the motor 20 is PWM-driven through an inverter 37 as a driving section. The current value Im of the motor 20 is detected by a motor current detector 38, and is fed back to the subtracting section 32B. FETs are used as driving elements within the inverter 37, which comprises a bridge circuit of FETs.

Further, in a case that the motor 20 is a brushless motor, since it is necessary to current-apply a current to a motor coil depending on a rotational angle of the motor, a rotational sensor 21 that uses a resolver or a magneto-resistive element (MR sensor) is needed. An output signal of the rotational sensor 21 is inputted into an angle detecting circuit 22 and then is processed. The angle detecting circuit 22 detects a rotational angle θ, and further an angular velocity calculating section 23 calculates an angular velocity ω.

A compensation signal CM from a compensation signal generating section 34 is added to an adding section 32A, and a characteristic compensation of the a steering assist system is performed by adding the compensation signal CM, and improves a convergence, an inertia characteristics and so on. The compensation signal generating section 34 adds a self-aligning torque (SAT) 343 and an inertia 343 at an adding section 344, adds the convergence 341 to an addition result at an adding section 345, and makes an addition result at the adding section 345 to be the compensation signal CM.

In the case that a high operability and a reliability of such an electric power steering apparatus are required, a high precision and a high failure-detectability of a rotational angle detecting mean are demanded. Therefore, 2-systematization (dual system) of the rotational angle detecting means and digitalizing (since SENT (Single Edge Nibble Transmission) standard and so on have a strong noise immunity) of a signal transmission means from a sensor module to an ECU have been strongly required.

For example, a brushless motor controlling method which the reliability is improved due to a redundancy is disclosed in Japanese Published Unexamined Patent Application No. 2004-194490 (Patent Document 1). That is, the apparatus thereof comprises plural Hall sensors, and there are provided the first sensor group that detect a rotor rotational position by detecting a magnetism of the rotor magnet and the second sensor group that comprise plural Hall sensors which are arranged with a space by a deviation angle to the Hall sensors. Then, the apparatus performs an overlap current-applying control by using the both sensor groups in the case the Hall sensors work normally, and performs a square-wave control by using the sensor group that does not contain a failed sensor in the case the Hall sensor is failed.

THE LIST OF PRIOR ART DOCUMENTS

Patent Documents

Patent Document 1: Japanese Published Unexamined Patent Application No. 2004-194490 A
Patent Document 2: Japanese Published Unexamined Patent Application No. 2011-244678 A

SUMMARY OF THE INVENTION

Problems to be Solved by the Invention

However, in the failure (abnormality) detection with a comparison due to the dual system, the means to detect an abnormal state is deficient in the case that the assist control is continued by using the rotational angle sensors of normal systems after one system becomes an abnormal state, and it is impossible to perform the high reliable motor control. Consequently, the means that stops the assist control after one system becomes abnormal is adopted in the electric power steering apparatus, and there is a problem that a load is given to a driver.

The present invention has been developed in view of the above-described circumstances, and an object of the present invention is to provide an electric power steering apparatus that has rotational angle detecting systems of 3-systems, detects an abnormal state (including a failure) with majority decision of 3-detected signals, and can instantly specify an abnormal system even if any one of the rotational angle detecting systems becomes abnormal, and has a function that continues an assist control by performing a high reliable angular detection by using other normal angle detecting signals.

Means for Solving the Problems

The present invention relates to an electric power steering apparatus that calculates a current command value based on at least a steering torque, performs a PWM-control of a brushless motor by an inverter based on the current command value, performs a current control by detecting a rotational angle of the brushless motor, and performs an assist-control of a steering system, the above-described object of the present invention is achieved by that the electric power steering apparatus comprising: rotational angle detecting systems of 3-systems to detect three rotational angles of the brushless motor; and an angle diagnosing section that compares absolute values of differences on respective angles outputted from the rotational angle detecting systems of 3-systems with a threshold, and performs a process by diagnosing whether the rotational angle detecting systems are normal or abnormal; wherein the assist control is continuously performed by using output angles outputted from systems diagnosed as being normal by means of the angle diagnosing section.

Further, the above-described object of the present invention is more effectively achieved by that, wherein the angle diagnosing section diagnoses that judges a normal state when an absolute value of respective angle differences is smaller than the threshold, and does an abnormal state when the absolute value of the each angle difference is equal or more than the threshold; or wherein when all of absolute values of the respective angle differences are smaller than the threshold, any one of the 3-systems is outputted as an output angle; or wherein when one of the absolute values of the respective angle differences is smaller than the threshold, the assist control is continuously performed by using output angles outputted from 2-normal systems except for one system which is diagnosed as being abnormal; or wherein an abnormality diagnosis on the output angles of the 2-normal systems is continued; or wherein when the systems which are diagnosed as being abnormal are two or more, the assist control is stopped or a sensorless driving is performed.

Effects of the Invention

According to the electric power steering apparatus of the present invention, since the rotational angle detecting systems are 3-systems and the abnormal state (including the failure) is detected with the majority decision of the 3-detected signals, it is possible to instantly specify an abnormal system even if any one of the rotational angle detecting systems become abnormal and to continue the assist control by performing a high reliable angular detection by using other normal angle detecting signals. Further, since it is possible to mutually monitor after the occurrence of the abnormality for the first system, there is an advantage that the possibility of the stop of the assist control decreases after the occurrence of one system abnormal state. Therefore, a work load for a driver is reduced.

MODE FOR CARRYING OUT THE INVENTION

The present invention is a high reliable electric power steering apparatus that detects rotational angles of a brushless motor by a rotational angle detecting systems of 3-systems and diagnoses normality/abnormality (including a failure) of each system with a majority decision, and continues the assist-control by using detected angles of the rotational angles of detecting systems of other normal 2-systems in a case only one system is diagnosed as being abnormal. Since the rotational angle detecting systems are 3-systems and the abnormal state (including the failure) is detected with the majority decision of the 3-detected signals, it is possible to instantly specify an abnormal system even if any one of the rotational angle detecting systems become abnormal and to continue the assist control by performing a high reliable angular detection by using other normal angle detecting signals.

A rotational angle sensor that the present invention uses is a resolver or an MR sensor and so on, and an angle signal from each system is assumed for digital output of SENT communication standard and so on or for an analogue output corresponding to an angle value.

Hereinafter, embodiments of the present invention will be described in detail with reference to the accompanying drawings.

Figure 1:
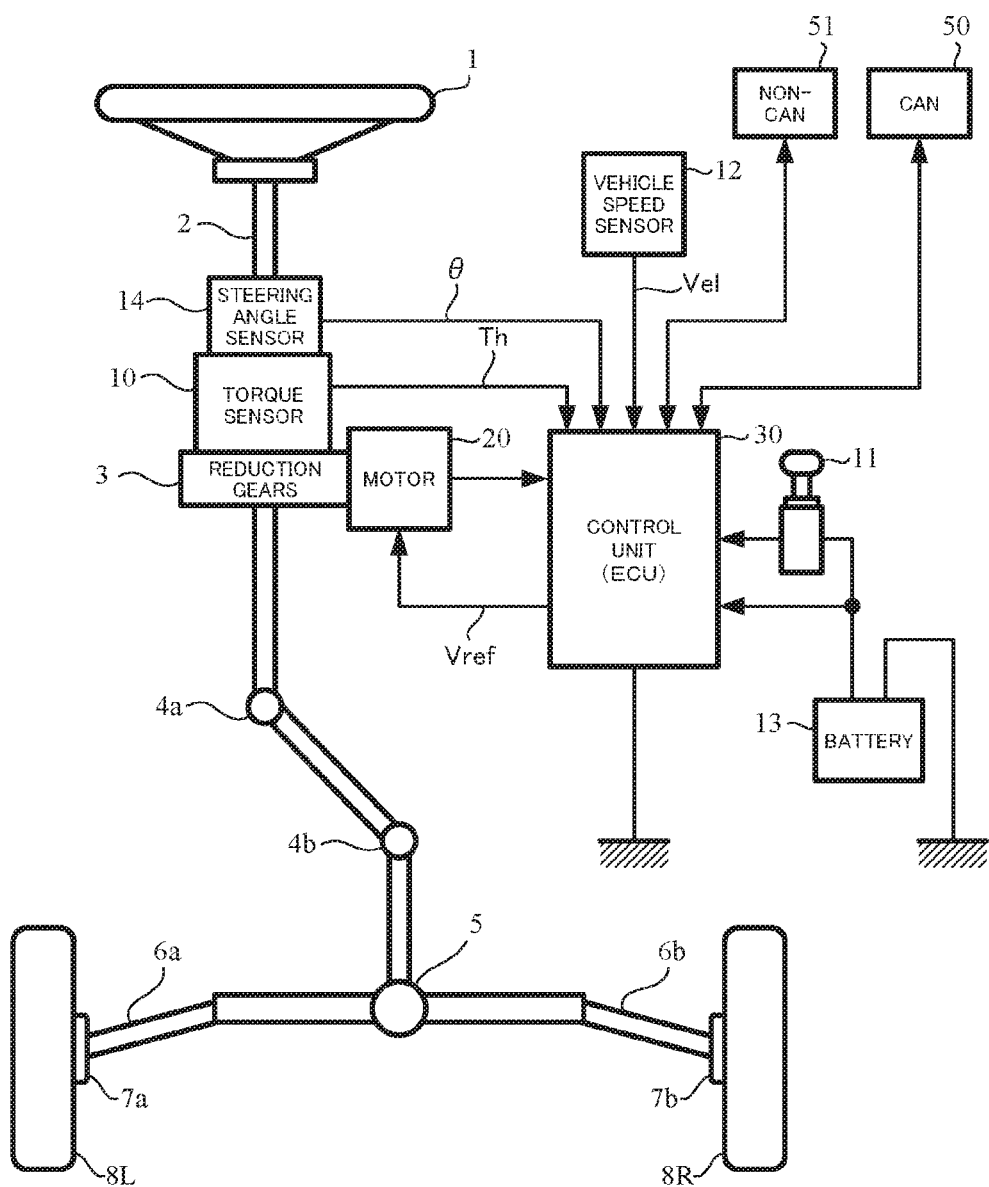
FIG. 1 is a configuration diagram illustrating a general outline of an electric power steering apparatus.
Figure 2:
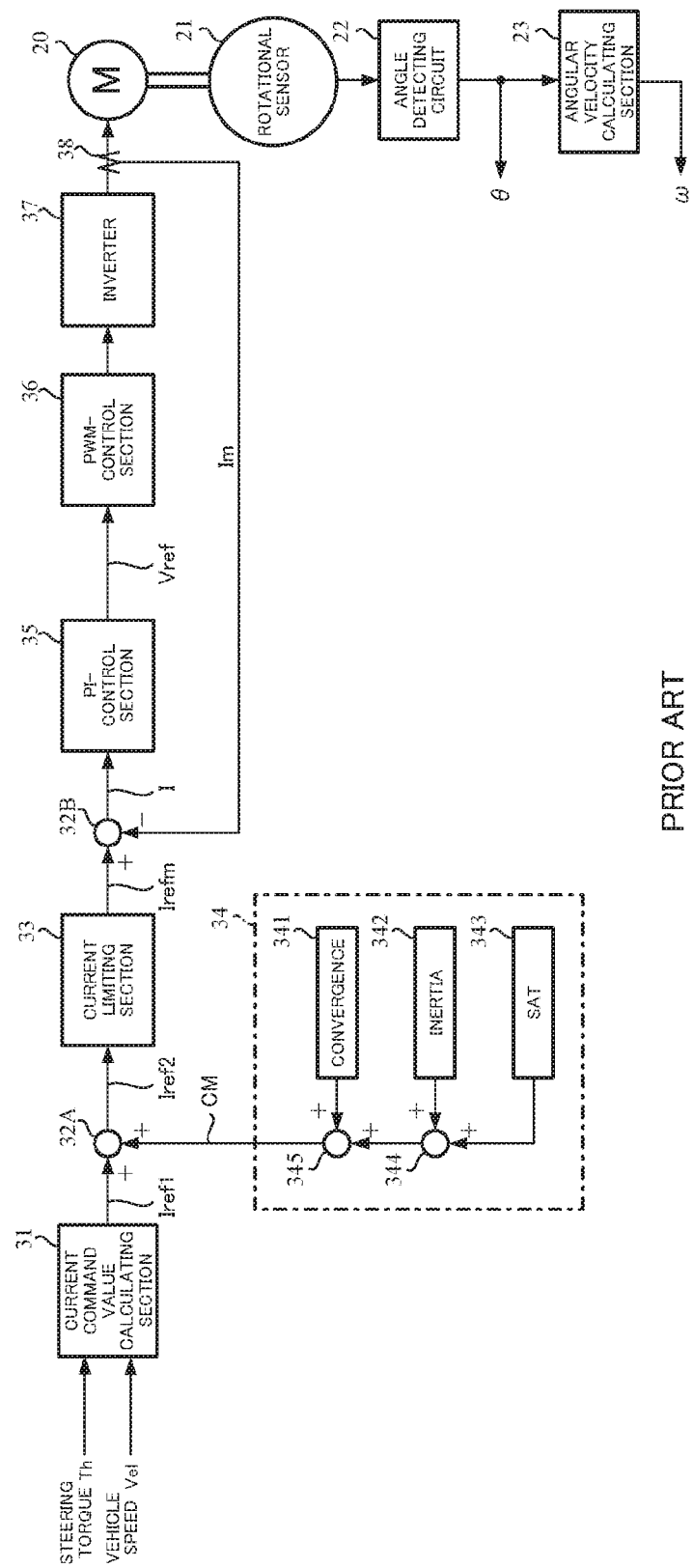
FIG. 2 is a block diagram showing a configuration example of a control system of the electric power steering apparatus.
Figure 3:
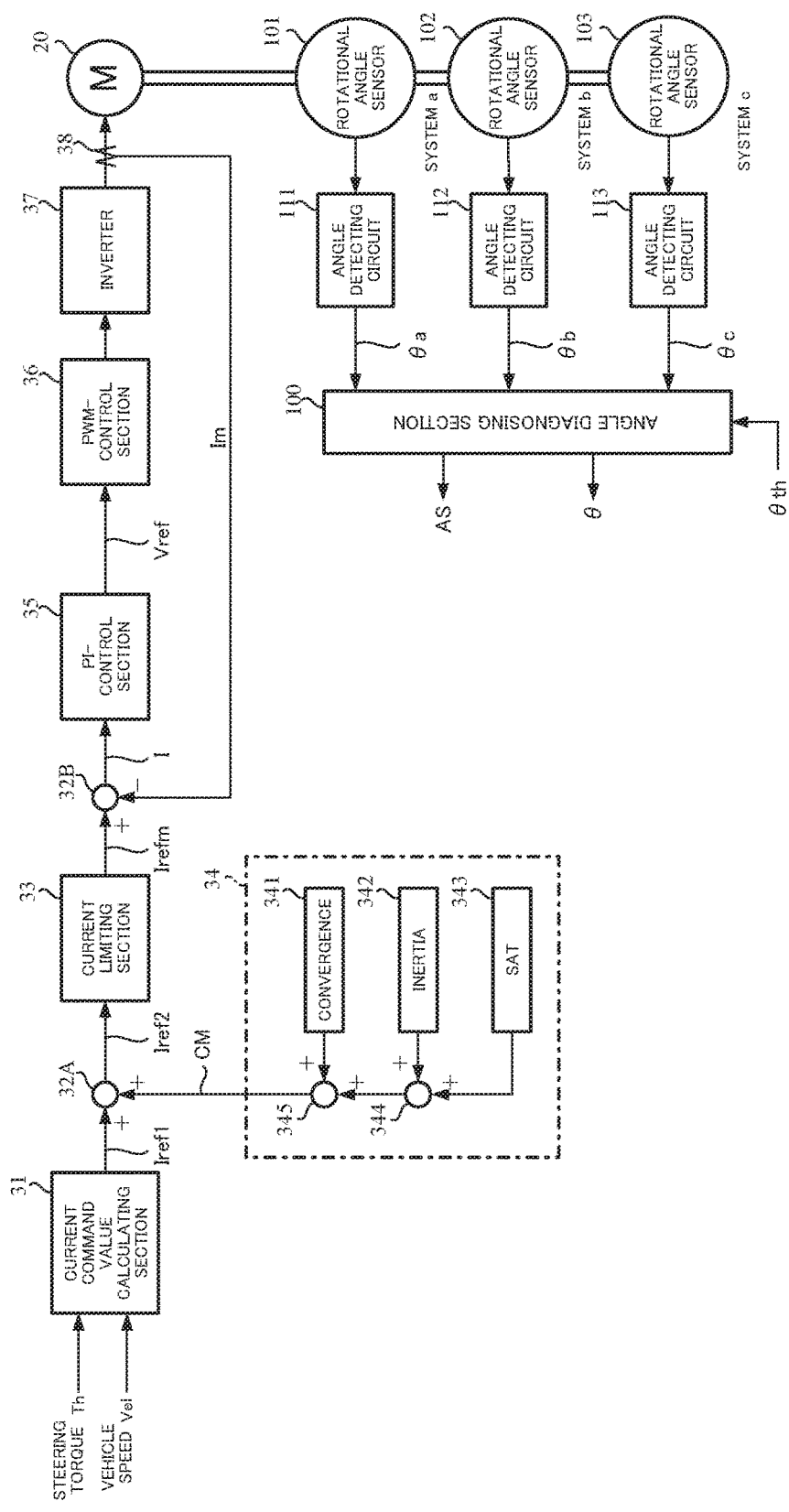
FIG. 3 is a block diagram showing a configuration example of the present invention.

FIG. 3 shows an embodiment of the present invention corresponding to FIG. 2. As shown in FIG. 3, rotational angle sensors 101, 102, 103 such as MR sensors, resolvers and so on are connected to a brushless motor 20 with 3-systems, angle detecting circuits 111, 112, 113 which process signals are respectively connected to the rotational angle sensors 101, 102, 103, and detected rotational angles θa, θb, θc are respectively outputted from the angle detecting circuits 111, 112, 113. The rotational angle sensor 101 and the rotational angle detecting circuit 111 comprise a rotational angle detecting system of a system-a, the rotational angle sensor 102 and the rotational angle detecting circuit 112 comprise a rotational angle detecting system of a system-b, the rotational angle sensor 103 and the rotational angle detecting circuit 113 comprise a rotational angle detecting system of a system-c, and an entire system comprises rotational angle detecting systems of the 3-systems.

Detected rotational angles θa~θc outputted from the angle detecting circuits 111, 112, 113 are inputted into an angle diagnosing section 100, and a threshold θth for judgement of an abnormal state is also inputted into the angle diagnosing section 100. The angle diagnosing section 100 diagnoses the abnormal state/the normal state (including the failure) of the rotational angle detecting systems of 3-systems based on inputted rotational angles θa~θc and the threshold θth, and outputs an abnormal signal AS that stops the rotational angle θ or the assist control, or performs a sensorless driving.

Figure 4:
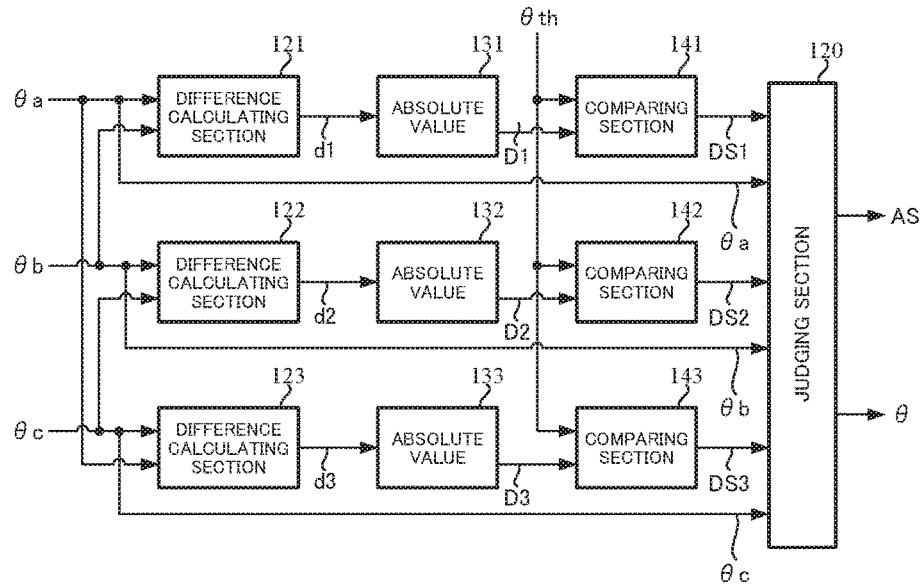
FIG. 4 is a block diagram showing a configuration example a of diagnosing control section according to the present invention.

For example, the angle diagnosing section 100 has a configuration as shown in FIG. 4, and the detected rotational angle θa is inputted into difference calculating sections 121 and 123, the detected rotational angle θb is inputted into difference calculating sections 121 and 122, and the detected rotational angle θc is inputted into difference calculating sections 122 and 123. A difference d1 (=θa−θb) calculated in the difference calculating section 121 is converted to an absolute value D1 (=|θa−θb|) in an absolute value section 131, and the absolute value D1 is inputted into a comparing section 141. Further, a difference d2 (=θb−θc) calculated in the difference calculating section 122 is converted to an absolute value D2 (=|θb−θc|) in an absolute value section 132, and the absolute value D2 is inputted into a comparing section 142. Furthermore, a difference d3 (=θc−θa) calculated in the difference calculating section 123 is converted to an absolute value D3 (=|θc−θa|) in an absolute value section 133, and the absolute value D3 is inputted into a comparing section 143. A predetermined threshold θth is inputted into the comparing sections 141~143, the absolute values D1~D3 are respectively compared with the threshold θth in the comparing sections 141~143, and judged results DS1~DS3 of a normal state/an abnormal state are inputted into a judging section 120. The rotational angles θa~θc are also inputted into the judging section 120, and the judging section 120 outputs an angle θ based on the judgement results DS1~DS3 or the abnormal signal AS for the assist-stop or the sensorless driving.

Figure 5:
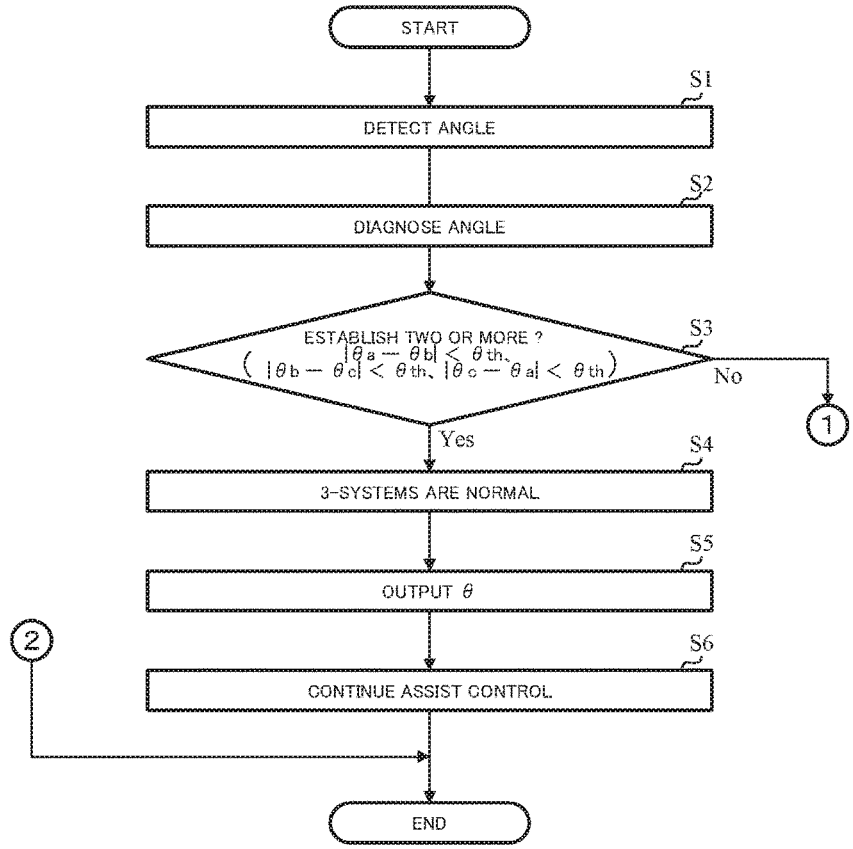
FIG. 5 is apart of a flowchart showing an operation example of the present invention.
Figure 6:
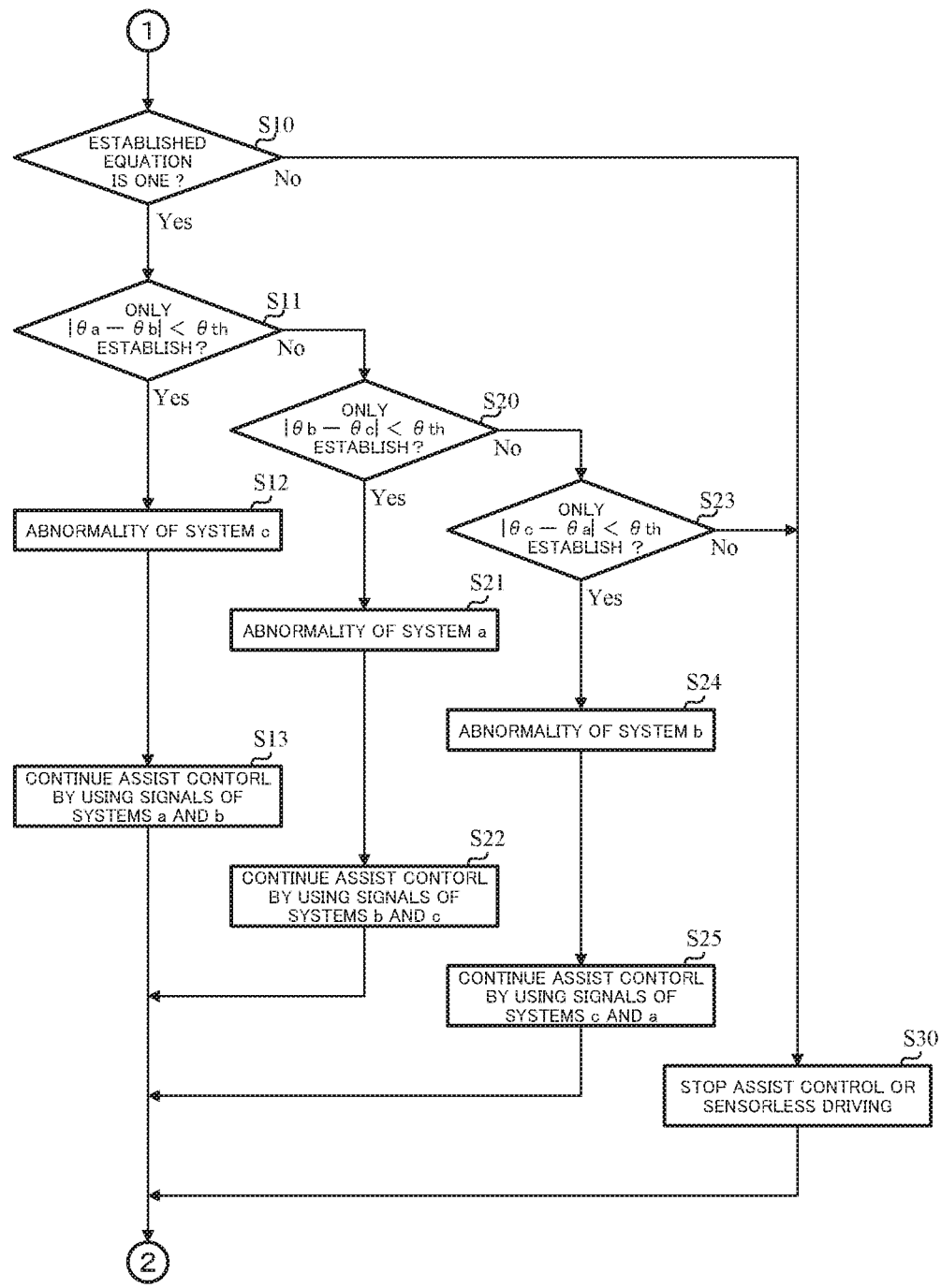
FIG. 6 is apart of a flowchart showing an operation example of the present invention.

In such a configuration, an entire operation example of the present invention will be described with reference to flowcharts shown in FIG. 5 and FIG. 6.

When the brushless motor 20 is driven for the assist control, the rotational angle sensors 101~103 rotate simultaneously and the rotational angles θa~θc are respectively detected by the angle detecting circuits 111~113 (Step S1). Then, the rotational angle θa is inputted into the difference calculating sections 121 and 123 in the angle diagnosing section 100, the rotational angle θb is inputted into the difference calculating sections 121 and 122, the rotational angle θc is inputted into the difference calculating section 122 and 123, and the angle diagnosis as follows is performed (Step S2). That is, the difference calculating section 121 calculates the difference d1 (=θa−θb), and the absolute value section 131 obtains the absolute value D1 (=|θa−θb|) of the difference d1 and inputs into the comparing section 141. Further, the difference calculating section 122 calculates the difference d2 (=θb−θc), and the absolute value section 132 obtains the absolute value D2 (=|θb−θc|) of the difference d2 and inputs into the comparing section 142. Similarly, the difference calculating section 123 calculates the difference d3 (θc−θa), and the absolute value section 133 obtains the absolute value D3 (=|θc−θa|) of the difference d3 and inputs into the comparing section 143. Then, the comparing sections 141~143 respectively compare the absolute values D1~D3 with the threshold θth and input the judgement result into the judging section 120. The comparing sections 141~143 respectively compare whether an equation "|θa−θb|<θth" establishes or not, an equation "|θb−θc|<θth" establishes or not, and an equation "|θc−θa|<θth" establishes or not, and the results make the judgement results DS1~DS3 respectively.

The judging section 120 judges whether two or more among the equations "|θa−θb|<θth, |θb−θc|<θth and |θc−θa|<θth" establish based on the inputted judgement results DS1~DS3 or not (Step S3). In the case that the two or more establish at the above Step S3, the rotational angle detecting systems of 3-systems are normal states (Step S4), and outputs one of the detected rotational angles θa~θc of any one system as the rotational angle θ (Step S5). In this way, the assist control is continued (Step S6).

On the other hand, in the case it judged that two or more equations do not establish at the Step S3, at first it judges whether one equation establishes or not (Step S10). In the case one equation establishes (in the case of "Yes"), at first it judges whether only the equation "|θa−θb|<θth" establishes or not (Step S11), and in the case only the equation "|θa−θb|<θth" establishes, it judges that the system-c is abnormal (Step S12). Hereinafter, the assist control is continued by using the signals (that is, the rotational angles θa and θb) of the system-a and the system-b (Step S13).

It judges whether only the equation "|θb−θc|<θth" establishes or not in the case it is judged "No" at the Step S11 (Step S20), and judges that the system-a is abnormal in the case that only the equation "θb−θc|<θth" establishes (the case of "Yes") (Step S21). Thereafter, the assist control is continued by using signals (that is, the rotational angles θb and θc) of the system-b and the system-c (Step S22).

Further, it judges whether only the equation "|θc−θa|<θth" establishes or not in the case it is judged "No" at the Step S20 (Step S23), and judges that the system-b is abnormal in the case that only the equation "|θc−θa|<θth" establishes (the case of "Yes") (Step S24). Thereafter, the assist control is continued by using signals (that is, the rotational angles θc and θa) of the system-c and the system-a (Step S25). AS well, an order of the comparison judgement is arbitrary and is modifiable appropriately.

As mentioned above, the assist control is continued by using the rotational angle of one of the normal system in the case an abnormal system is judged among 3-systems, and detects the abnormal state by comparing with the detected value from another normal system. As a result, in the case further an abnormal state is detected, that is, in the case of "No" at the Step 10 or "No" at the Step S23, and outputs the abnormal signal AS, and stops the assist control or performs the sensorless driving disclosed in the publication of Japanese Patent No. 2011-244678 (Patent Document 2) (Step S30).

For example, a torque except for a motor torque added to a driving target is detected, and set a torque command value that works the driving target and an added angle that a deviation between a detected torque and the torque command value becomes zero is calculated in the sensorless driving. In this way, the motor torque is controlled so as to become a state that the torque corresponding to the torque command value is able to add to the driving target, and corresponds to a load angle that is a shift between the a virtual axis and the axis of a rotational coordinate that follows the direction of the magnetic pole of the rotor.

EXPLANATION OF REFERENCE NUMERALS

1 steering wheel
2 column shaft (steering shaft, handle shaft)
10 torque sensor
12 vehicle velocity sensor
14 steering angle sensor
20 motor (brushless motor)
30 control unit (ECU)
31 current command calculating section
33 current limiting section
34 compensation signal generating section
35 PI-control section
36 PWM-control section
37 inverter
50 CAN
100 angle diagnosing section
101~103 rotational angle sensor
111~113 angle detecting circuit
120 judging section
121~123 difference calculating section
131~133 absolute value section
141~143 comparing section

The invention claimed is:

1. An electric power steering apparatus that calculates a current command value based on at least a steering torque, performs a PWM-control of a brushless motor by an inverter based on said current command value, performs a current control by detecting a rotational angle of said brushless motor, and performs an assist-control of a steering system, comprising:
rotational angle detecting systems of 3-systems to detect three rotational angles of said brushless motor; and
an angle diagnosing section that compares absolute values of differences on respective angles outputted from said rotational angle detecting systems of 3-systems with a threshold, and performs a process by diagnosing whether said rotational angle detecting systems are normal or abnormal;
wherein said angle diagnosing section diagnoses that judges a normal state when an absolute value of respective angle differences is smaller than said threshold, and does an abnormal state when said absolute value of said each angle difference is equal or more than said threshold so as to instantly specify an abnormal system even if any one of said rotational angle detecting systems of 3-systems becomes abnormal,
wherein when one of said absolute values of said respective angle differences is smaller than said threshold, said assist control is continuously performed by using output angles outputted from 2-normal systems except for one system which is diagnosed as being abnormal.

2. The electric power steering apparatus according to claim 1, wherein when all of absolute values of said respective angle differences are smaller than said threshold, any one of said 3-systems is outputted as an output angle.

3. The electric power steering apparatus according to claim 1, wherein an abnormality diagnosis on said output angles of said 2-normal systems is continued.

4. The electric power steering apparatus according to claim 1, wherein when said systems which are diagnosed as being abnormal are two or more, said assist control is stopped or a sensorless driving is performed.

* * * * *